(12) United States Patent
Somasundaram

(10) Patent No.: US 7,715,380 B2
(45) Date of Patent: May 11, 2010

(54) APPARATUS AND METHODS FOR HANDLING SHARED SERVICES THROUGH VIRTUAL ROUTE FORWARDING (VRF)-AWARE-NAT

(75) Inventor: Mahadev Somasundaram, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1365 days.

(21) Appl. No.: 10/600,893

(22) Filed: Jun. 19, 2003

(65) Prior Publication Data

US 2006/0013209 A1  Jan. 19, 2006

(51) Int. Cl.
*H04L 12/28* (2006.01)
*H04L 12/56* (2006.01)

(52) U.S. Cl. .................................................... 370/389
(58) Field of Classification Search ................. 370/389, 370/392
See application file for complete search history.

(56) References Cited

U.S. PATENT DOCUMENTS

| | | | | | |
|---|---|---|---|---|---|
| 5,852,606 | A | * | 12/1998 | Prince et al. | 370/395.53 |
| 5,991,297 | A | * | 11/1999 | Palnati et al. | 370/389 |
| 6,055,575 | A | * | 4/2000 | Paulsen et al. | 709/229 |
| 6,205,488 | B1 | * | 3/2001 | Casey et al. | 709/238 |
| 6,463,061 | B1 | * | 10/2002 | Rekhter et al. | 370/392 |
| 6,751,220 | B1 | * | 6/2004 | Li | 370/390 |
| 6,788,681 | B1 | * | 9/2004 | Hurren et al. | 370/389 |
| 6,928,082 | B2 | * | 8/2005 | Liu et al. | 370/401 |
| 6,970,464 | B2 | * | 11/2005 | Xu et al. | 370/392 |
| 7,072,346 | B2 | * | 7/2006 | Hama | 370/395.53 |
| 7,099,947 | B1 | * | 8/2006 | Nadeau et al. | 709/229 |
| 7,227,867 | B1 | * | 6/2007 | Ferguson et al. | 370/395.5 |
| 2002/0143787 | A1 | * | 10/2002 | Knee et al. | 707/102 |
| 2003/0086422 | A1 | | 5/2003 | Klinker et al. | |
| 2003/0142669 | A1 | * | 7/2003 | Kubota et al. | 370/389 |
| 2004/0174879 | A1 | * | 9/2004 | Basso et al. | 370/392 |

FOREIGN PATENT DOCUMENTS

EP  1 298 853 A1  2/2003

(Continued)

OTHER PUBLICATIONS

RFC 2663, IP Network Address Translator (NAT) Terminology and Considerations, Aug. 1999.*

(Continued)

*Primary Examiner*—Ayaz R Sheikh
*Assistant Examiner*—Blanche Wong
(74) *Attorney, Agent, or Firm*—Weaver Austin Villeneuve & Sampson LLP

(57) ABSTRACT

Methods and apparatus for performing NAT are disclosed. Specifically, NAT is performed at a service provider network device associated with an interface of a service provider network. When a packet is sent from a VPN to a node outside the service provider network (e.g., to access a shared service), the packet includes a VPN identifier (or VRF identifier) In accordance with various embodiments, each packet includes an MPLS tag that includes the VPN identifier. The VPN identifier is stored in a translation table entry. The storing of the VPN identifier will enable a reply packet from the shared service network to the customer VPN to be routed using a routing table identified by the VPN identifier.

24 Claims, 5 Drawing Sheets

FOREIGN PATENT DOCUMENTS

| EP | 1298853 A1 | 2/2003 |
|---|---|---|
| EP | 1 298 853 | 4/2003 |

OTHER PUBLICATIONS

RFC 2547, "BGP/MPLS VPNs", Mar. 1999.*

Chinese First Office Action dated Aug. 8, 2008 from corresponding Chinese Application No. 200480011093.2, 17 pages.

Australian Office Action dated Apr. 6, 2009 from Application No. 2004250904, 2 pgs.

Canadian Office Action dated Apr. 16, 2009 from Application No. 2,521,540; 6 pgs.

Badran, "Service Provider Networking Infrastructures with MPLS", XP002906445, Proceedings from the Sixth IEEE International Symposium on Computers and Communications, Jul. 3, 2001, pp. 312-318, XP010552552; 8 pgs.

PCT Written Opinion of the International Searching Authority, date of mailing Oct. 13, 2004, PCT/US2004/018112.

H.F. Badran, *Service Provider Networking Infrastructures with MPLS*, 2001 IEEE, 1530-1346/01.

E. Rosen et al., "BGP/MPLS VPNs", RFC 2547, Mar. 1999, 25 pp.

J. Rosenberg et al., "STUN—Simple Traversal of User Datagram Protocol (UDP) Through Network Address Translators (NATs)", RFC 3489, Mar. 2003, 47 pp.

P. Srisuresh et al., "IP Network Address Translator (NAT) Terminology and Considerations", RFC 2663, Aug. 1999, 30 pp.

R.P. Swale et al., "Middlebox Communications (midcom) Protocol Requirements", RFC 3304, Aug. 2002, 9 pp.

P. Srisuresh et al., "Middlebox Communication Architecture and Framework", RFC 3303, Aug. 2002, 34 pp.

A.F. Simu et al., "Method and Appratus for Indicating Network Address Translation (NAT) Topology Information to a NAT Device That is Physically Separate From an Application Layer Gateway (ALG) Device", U.S. Appl. No. 10/125,300, filed Apr. 17, 2002, 49 pp.

M. Somasundaram et al., "Method and Apparatus for Handling Embedded Addresses in Data Sent Through Multiple Network Address Translation (NAT) Devices", U.S. Appl. No. 10/202,973, filed Jul. 24, 2002, 45 pp.

K.P. Biswas et al., "Method and Apparatus for Making End-Host Network Address Translation (NAT) Global Address and Port Ranges Aware", U.S. Appl. No. 10/160,321, filed May 31, 2002, 55 pp.

K.P. Biswas et al., "Mechanisms for Detection of Non-Supporting NAT Traversal Boxes in the Path", U.S. Appl. No. 11/026,891, filed Dec. 30, 2004, 46 pp.

Examiner's Communication pursuant to Article 96(2) EPC dated Aug. 4, 2006, from related European Patent Application No. 04 754 664.3, Apparatus and Methods for Handling Shared Services Through Virtual Route for Warding (VRF)-Aware-NAT, 7 pp.

H.F. Badran, "Service Provider Networking Infrastructures with MPLS", XP002906445 Proceedings IEEE International Symposium on Computers and Communications, Jul. 3, 2001, pp. 312-318, XP010552552, 7 pp.

* cited by examiner

| VRF Table/ VPN 404 | Inside local 406 | Inside public 408 | Outside local 410 | Outside public 412 |
|---|---|---|---|---|
| VPN 1 | 10.1.1.1 | 172.1.1.1 | 192.1.1.1 | 192.1.1.1 |
| | | | | |

APPARATUS AND METHODS FOR HANDLING SHARED SERVICES THROUGH VIRTUAL ROUTE FORWARDING (VRF)-AWARE-NAT

BACKGROUND OF THE INVENTION

The present invention relates to methods and apparatus for processing data within a computer network. More specifically, this invention relates to mechanisms for forwarding packets that either request or provide shared services that are available to a plurality of Virtual Private Networks (VPNs) via a service provider network.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device matches the local computer's local IP address to one of the intermediary device's assigned IP addresses. The intermediary device than replaces the local computer's local address with the matched assigned IP address. This matched assigned IP address is then used to communicate between the local computer and the outside computer. Thus, NAT techniques allow an IP address to be duplicated across local networks.

In addition to IP addresses, a packet may also contain address(es) embedded in the payload that require translation. Particular applications may embed address(es) in the payload for various application specific purposes. The current approach for supporting applications which embed IP addresses in the payload (e.g., DNS (domain name server), FTP (file transfer protocol), H.225/H.245) in a NAT environment is to add application-specific knowledge within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

An enterprise network is typically a private network associated with an enterprise such as a company or business. In order for an enterprise network to communicate with a service provider network or the Internet, a NAT device intercepts packets and performs network address translation on packets prior to forwarding them to the intended recipient. While an enterprise network may be implemented at a single location or site, an enterprise network is often implemented in physically disparate locations. In other words, multiple sites associated with a single enterprise (e.g., company) may be seen by a service provider network as a single network. This is accomplished through associating each enterprise (e.g., business or customer) with a virtual private network (VPN). In this manner, multiple customer sites associated with a single enterprise may be seen as a single entity by a service provider.

In accordance with various prior art mechanisms, each enterprise (e.g., customer) may be identified with a virtual private network. Each enterprise site typically uses private addresses which are not recognized by the service provider. As a result, a NAT device is typically used to translate addresses of packets transmitted between the enterprise and the Service Provider network.

Various companies and enterprises may have services that they want to offer or share with customers or partners. Thus, a service provider may wish to offer services (i.e., shared services) to multiple enterprise customers. For instance, such shared services may include Voice over IP, Voice Gatekeeper, and Internet access. Thus, clients accessing these shared services offered by the Service Provider should be uniquely addressable. While IPv6 promises an IP address space that exceeds the connectivity needs of the foreseeable future, IPv6 is still in its early phases of deployment. As a result, enabling enterprise clients to be uniquely addressable is typically accomplished through NAT.

Typically, the NAT device is implemented at each enterprise site. As a result, a pool of public addresses must typically be pre-allocated to each enterprise customer. In addition, since a NAT device is typically placed at each enterprise site, implementing NAT by an enterprise having multiple sites can be unwieldy, as well as costly.

In view of the above, it would be beneficial if improved techniques for providing NAT could be implemented.

SUMMARY OF THE INVENTION

Methods and apparatus for performing NAT are disclosed. Specifically, NAT is performed at a service provider network device associated with an interface of a service provider network. When a packet is received by the service provider network device, NAT is performed on the packet and routed accordingly.

In accordance with one aspect of the invention, a network device referred to herein as a service provider edge box also includes or is associated with a NAT device for performing NAT. In order to enable the service provider to perform NAT, it must be able to discern between potentially identical private addresses in two or more VPNs. Thus, the network device maintains a plurality of routing tables (i.e., virtual route forwarding tables (VRFs)), each of the routing tables being associated with a different virtual private network (e.g., customer). In accordance with one embodiment, when a packet is translated and transmitted from inside a virtual private network to an address outside the virtual private network, a VRF or VPN identifier is stored in the translation table entry. In addition, the appropriate routing table identified by the VRF or VPN is updated with routing information for the packet, as appropriate. When a packet is received from the public domain, the packet includes information indicating or identifying one of the plurality of routing tables appropriate for routing the packet. In accordance with one embodiment, the packet includes a VRF or VPN identifier. When NAT is performed on the packet, the appropriate one of the routing tables is identified (e.g., through the use of the VRF or VPN identifier stored in the translation table entry). An entry in the routing table is then identified using the IP source and destination addresses obtained from the received packet. The packet is then routed using the identified routing table entry.

In accordance with various embodiments, the present invention is compatible with networks enhanced with Multi-Protocol Label Switching (MPLS) capabilities as defined in RFC 2547, entitled "BGP/MPLS VPNs," by Rosen et al, March 1999, which is incorporated herein by reference for all purposes. Thus, the packet received includes an MPLS tag that includes a VPN identifier (or VRF table identifier). Thus, NAT may be accomplished, for example, through the use of a translation table that includes a VPN identifier in each table entry. In order to route the translated packet, the service provider network device maintains a plurality of routing tables (i.e., virtual route forwarding tables) that are associated with a plurality of VPNs. One of the routing tables is identified corresponding to a VPN or VRF table identifier present in the packet (e.g., MPLS tag) (which may also be stored in the translation table entry used to perform NAT). Once the routing table is identified, an entry in the routing table is identified using the IP source and destination addresses from the packet. The packet may then be routed using the identified routing table entry.

In accordance with various embodiments of the invention, the MPLS tag of a packet received by the network device identifies the service provider network device responsible for performing NAT. Thus, if the receiving device is not identical to the device identifier, the receiving device merely forwards the packet onward. If the receiving device is identified by the device identifier in the MPLS tag, the receiving network device performs NAT and routes the packet as disclosed herein.

In accordance with various embodiments of the invention, each routing table is updated with default routes to shared services. In other words, when advertisements are received for shared services, the advertised default routes are added or updated in each of the routing tables. In this manner, each routing table associated with each virtual private network is updated to enable shared services to be received by each virtual private network. Of course, it is also possible to otherwise tag default routes to shared services, such as in a separate routing table or in a single table shared among all VPNs through the use of a shared services tag or identifier.

In accordance with yet another aspect of the invention, the NAT device performs network address translation (NAT). In general terms, mechanisms (e.g., within a combination router/NAT device) are provided for translating network addresses of traffic going between two private domains or realms. These mechanisms may also be used to translate traffic going between a private and public domain.

In accordance with another aspect of the invention, the invention pertains to a network address translation (NAT) system operable to perform network address translation. The NAT system includes one or more processors and one or more memories. At least one of the memories and processors are adapted to provide at least some of the above described method operations. In yet a further embodiment, the invention pertains to a computer program product for performing network address translation on data. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In the following description, various embodiments of the invention propose a solution to enable a provider network to provide "shared services" to multiple VPNs and associated customers. These services may include, but are not limited to, Internet access, Voice Gatekeepers, and proxies. In order to support such services to customers having associated virtual private networks, the provider network maintains routing information for each virtual private network to be used in connection with NAT processing. In this manner, support for IP services may be extended to multiple enterprise customers. In this manner, the burden of performing NAT may be shifted from the customers to the service provider network.

Figure 1:
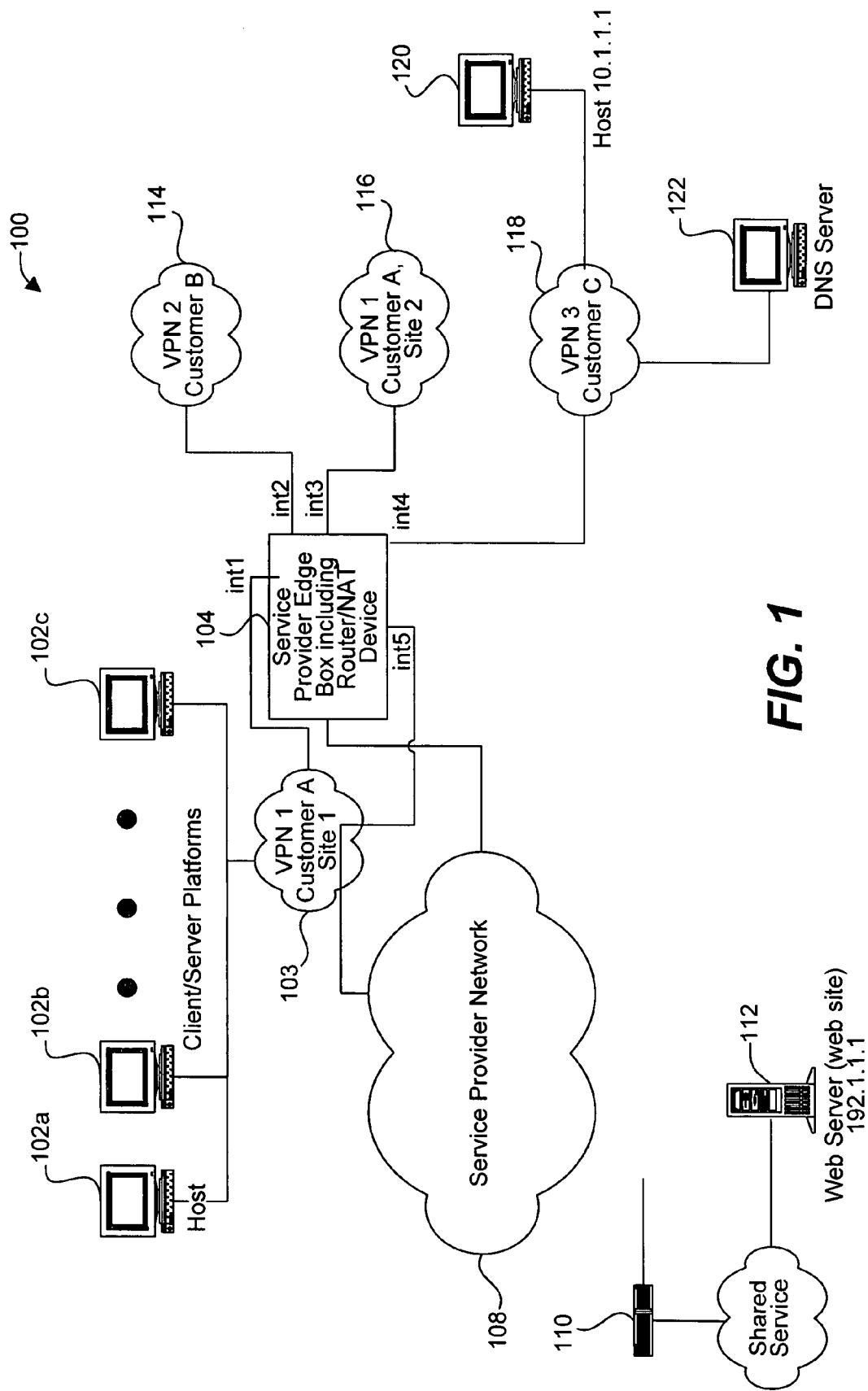
FIG. 1 is a diagrammatic illustration of portions of a network in which the techniques of the present invention may be implemented by a service provider network in accordance with one embodiment of the present invention.

FIG. 1 is a diagrammatic illustration of portions of a network 100 in which the techniques of the present invention may be implemented in accordance with one embodiment of the present invention. In general terms, the present invention provides mechanisms for performing network address translation (NAT) between a plurality of different domains. The different domains may both be private domains, may both be public domains, or one may be private and the other public. In accordance with a preferred embodiment, selected domains correspond to virtual private networks (VPNs). In addition, each of the domains may implement a different version of IP. In the illustrated embodiment, these NAT techniques are implemented within a combination router and NAT device 104. Of course the NAT techniques of the present invention may be implemented in any suitable number and type of devices. In accordance with various embodiments of the invention, the NAT device is implemented in a service provider edge box that is implemented at an ingress interface of the service provider network and/or an egress interface of the service provider network.

In the illustrated example, the service provider edge box (and NAT device) 104 has five interfaces INT1 through INT5. Four of the interfaces INT1 through INT4 are each coupled to a private domain. For example, interface INT1 is coupled to private Domain1 103 and interface INT4 is coupled with private Domain4. Each domain may include any suitable number of local and private networks. As shown, Domain1 103 includes a private local area network (LAN) 102 of host computers (e.g., 102a, 102b, and 102c). In this example, Domain 1 103 is implemented as a Virtual Private Network (VPN), and is referred to as VPN 1 corresponding to a first customer site, site 1, of Customer A. Domain 2 114 is associated with VPN 2 corresponding to Customer B. Domain 3 116 is associated with a second customer site, site 2, of Customer A, and is therefore also associated with VPN 1. Domain4 118 is associated with VPN 3 corresponding to Customer C, and includes Host 120 and DNS Server 122. Domain4 118 may include other server or client platforms (not shown). The service provider edge box (and NAT device) 104 is also coupled to a public Domain5 (e.g., Service Provider Network) 108 through interface INT5. Domain5 108 includes server 112, which may be accessed through router 110. Thus, a shared service such as a web server and associated web site may be accessed via the server 112.

Any number of routers and/or NAT devices may be distributed throughout network 100. For example, each domain may be associated with its own router/NAT device. However, in accordance with various embodiments of the invention, the service provider edge box 104 performs NAT for multiple customers, thereby eliminating the need for a separate NAT device at each VPN or customer site.

A Service Provider may wish to deploy a variety of shared services and provide access to those shared services. In fact, additional service offerings can be a differentiator over competitors. Enterprise customers can therefore benefit from wider offerings by service providers. Moreover, shifting the burden of performing any necessary address translation to the Service Provider network relieves them of a complicated administrative task. As a result, customers may continue to use private addressing, yet maintain access to shared services and the Internet. In addition, consolidating the NAT function within the Service Provider network may also lower the total cost to enterprise customers since the customer enterprise routers at the edge of the enterprise networks do not have to perform the NAT function.

Since the service provider edge box provides VPN access for each customer enterprise network (for remote customers), the service provider maintains a plurality of routing tables (i.e., virtual route forwarding tables) for each of the VPNs. In this manner, the service provider may distinguish between potentially identical private addresses supported by multiple VPNs.

Figure 2:
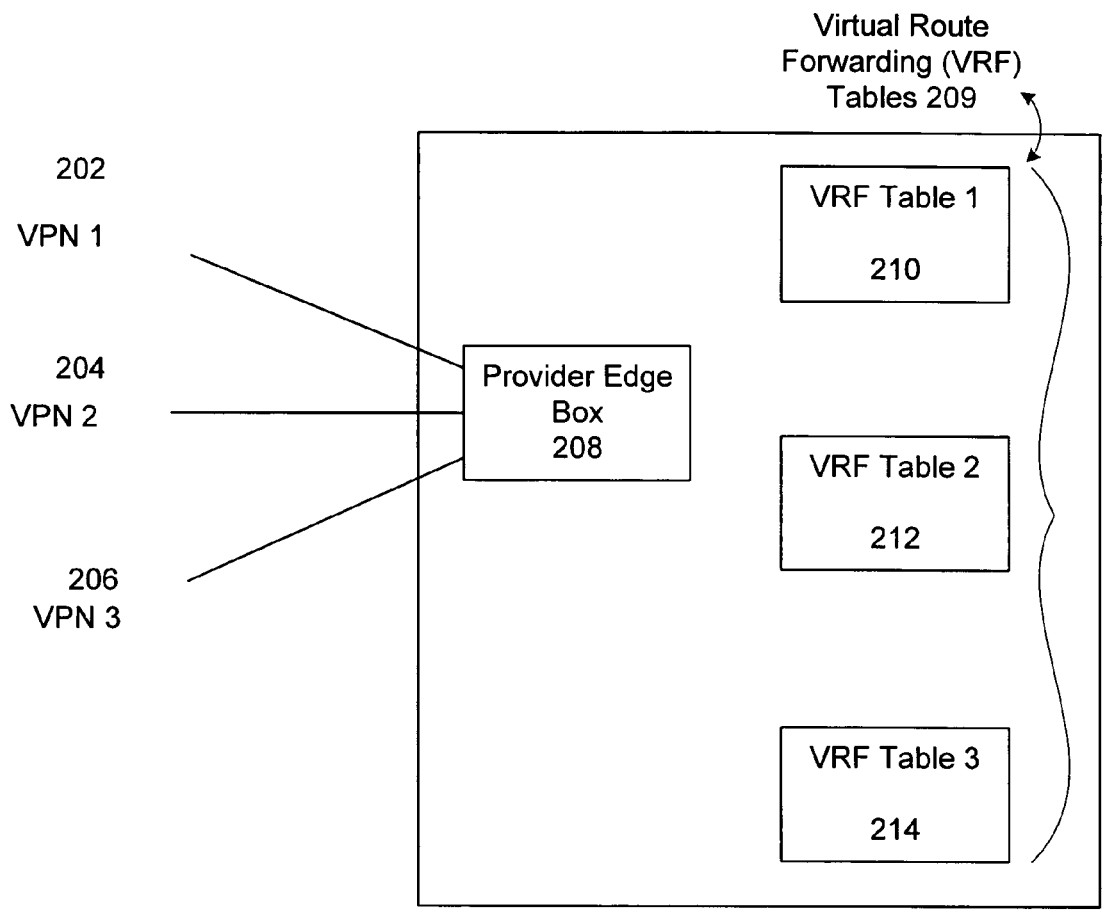
FIG. 2 is a diagram illustrating a plurality of virtual route forwarding tables that are maintained by a provider NAT device in accordance with various embodiments of the invention.

FIG. 2 is a diagram illustrating a plurality of virtual route forwarding tables that are maintained by a provider NAT device in accordance with various embodiments of the invention. As shown, service provider edge box 208 is coupled to one or more virtual private networks. Specifically, in this example, three different VPNs 202, 204, and 206 are coupled to the service provider edge box 208. The service provider edge box 208 maintains a plurality of VRF tables 209, each of the routing tables being associated with a different VPN. As shown, VRF table 1 210 is associated with VPN1, VRF table 2 212 is associated with VPN2, and VRF table 3 214 is associated with VPN3. The routing tables 210, 212, 214 may be stored in the provider edge box 208 (as shown), or in a memory associated with the provider edge box 208.

In order to route a packet, the service provider must first identify the appropriate routing table. Traditionally, each customer enterprise network maintained its own routing table. By supporting multiple routing tables, the service provider network may identify the appropriate routing table and forward a packet accordingly. This may be accomplished by obtaining information indicating a VPN and/or VRF table to route the packet. Specifically, this information may be obtained from the packet to be routed.

Figure 3:
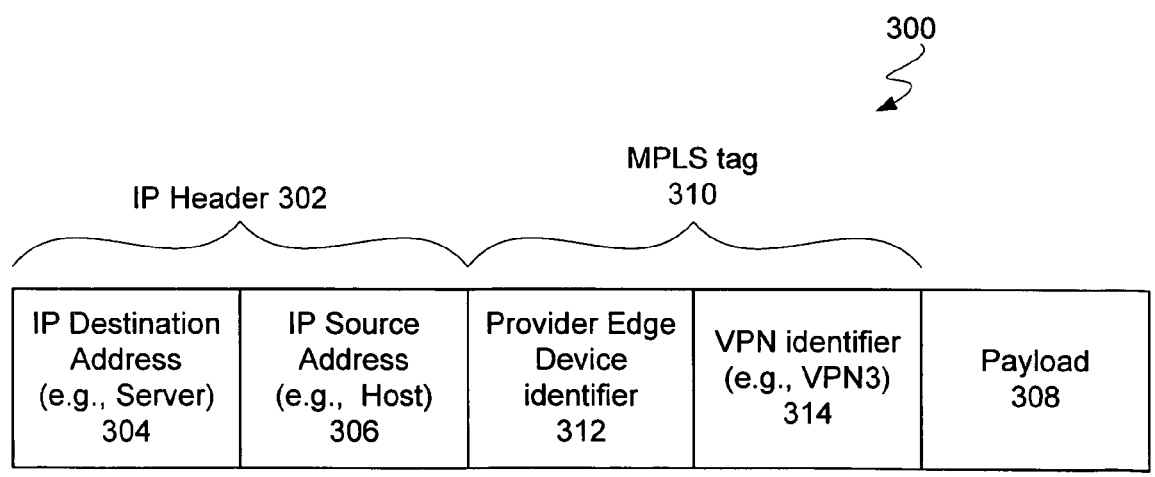
FIG. 3 is a process flow diagram illustrating a packet including a Multi Protocol Label Switching (MPLS) tag that is forwarded by a NAT device in accordance with various embodiments of the invention.

Many Service Providers are currently enhancing their networks with Multi-Protocol Label Switching (MPLS). FIG. 3 is a process flow diagram illustrating a packet including a Multi Protocol Label Switching (MPLS) tag that is forwarded by a NAT device in accordance with various embodiments of the invention. As shown, packet 300 includes an IP header 302, which includes an IP destination address 304 and an IP source address 306. In this example, the IP destination address 304 is the server 112 and the IP source address 306 is the host 120. The packet 300 further includes a payload 308 and an MPLS tag 310. A simplified version of the MPLS tag shows a provider edge device identifier 312, which identifies the provider edge device from which the packet was sent. In addition, a VPN identifier 314 identifies the virtual private network from which the packet has been sent. In this example, the VPN identifier 314 identifies VPN 3. A more detailed description of the contents of an MPLS tag is disclosed in RFC 2547.

Figures 4, 5:
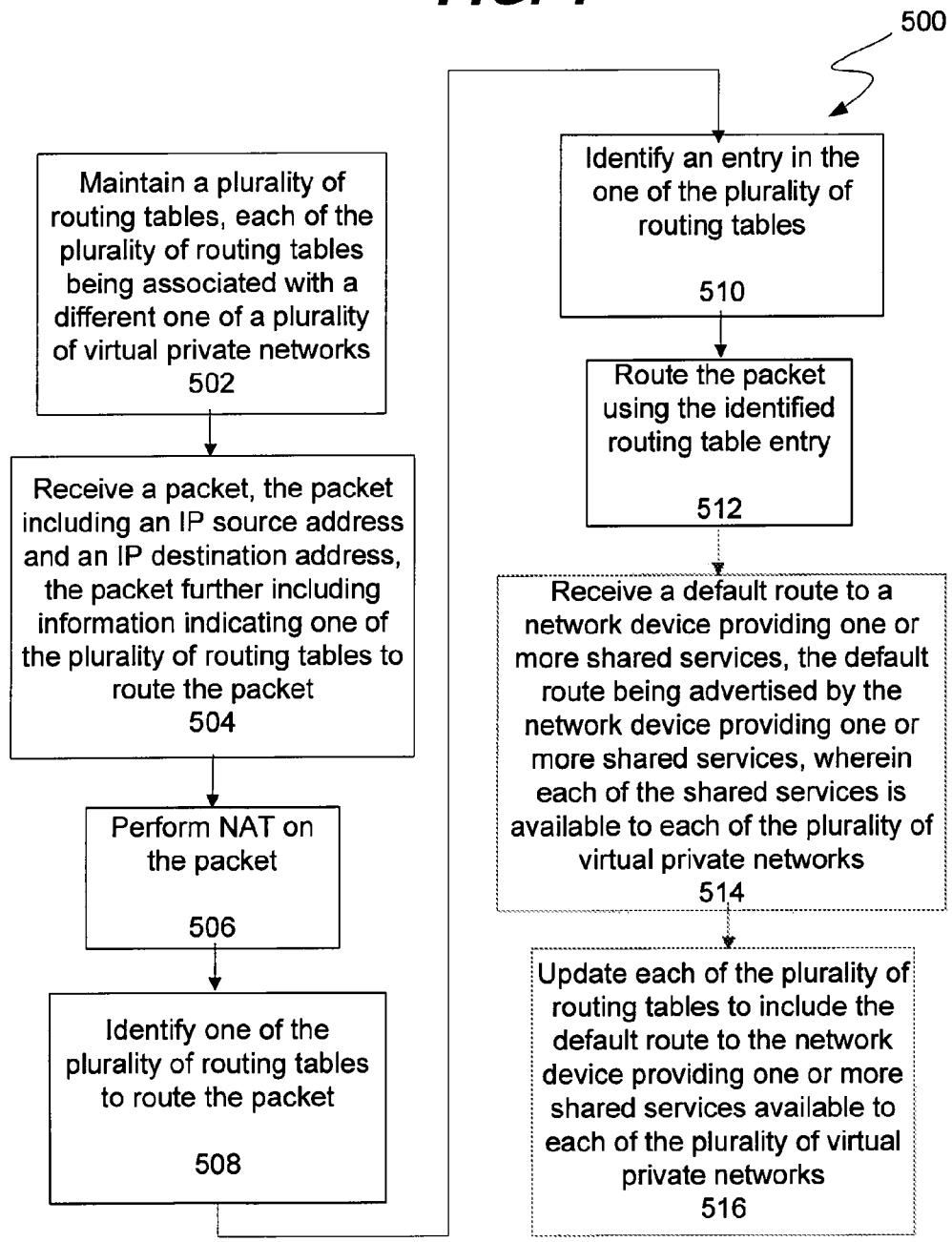
FIG. 4 is a diagram illustrating a translation table maintained by a NAT device in accordance with various embodiments of the invention.
FIG. 5 is a process flow diagram illustrating a method of processing a packet by a NAT device in accordance with various embodiments of the invention.

In order to perform NAT, a translation table is typically used. FIG. 4 is a diagram illustrating a translation table maintained by a NAT device in accordance with various embodiments of the invention. Specifically, the translation table 400 includes a plurality of entries 402. Each entry 402 includes a VPN identifier or VRF table identifier 404, an "inside" local address 406, an "inside" public address 408, an "outside" local address 410, and an "outside" public address 412. In other words, the "local" addresses correspond to IP addresses that may be used within a virtual private network (i.e., private addresses) and the "public" addresses correspond to IP addresses that may be used outside of the virtual private network (i.e., public addresses). Local addresses are used when packets are sent to nodes within the virtual private network, while public addresses are used when packets are sent to nodes outside the virtual private network. The "outside" addresses correspond to the addresses or nodes outside the virtual private network, while the "inside" addresses identify those addresses or nodes that are within the virtual private network. In this example, server 112 of FIG. 1 has address 192.1.1.1 and host 120 of FIG. 1 has address 10.1.1.1. Specifically, the address 10.1.1.1 may be shared by multiple hosts of multiple VPNs. Thus, the VPN identifier of the translation table entry may be used to distinguish between these hosts. The VPN identifier may, for example, be obtained from a MPLS tag of the packet.

In accordance with one embodiment, when a packet is transmitted from inside the VPN to outside the VPN, NAT is performed and a translation table entry is created. As described above, the VRF or VPN identifier is stored in the translation table entry. The appropriate routing table, as identified by the VRF or VPN identifier, is also updated.

Once the appropriate entry has been identified using the IP source and destination addresses and the VPN identifier, the corresponding public addresses are obtained to perform NAT in order to transmit a packet from the host to the web site. The packet may then be transmitted with the modified, public addresses. In this example, the host address 10.1.1.1 is translated to 172.1.1.1 and the server address remains the same, since it is a public address. Thus, when a packet is sent from a private IP source address, the IP source address is translated from a private address to a public address.

In order to transmit a packet from the web site to the host, the server provider box looks at the appropriate translation table entry using the IP source and destination addresses. The source IP address of the server remains the same, while the destination IP address, 172.1.1.1, is translated to 10.1.1.1. Thus, when a packet is sent from a public IP source address, the public IP destination address is translated to a private address when the IP destination address is located in a private network or VPN. A method of processing a packet received by a service provider network device from outside the VPN will be described in further detail below with reference to FIG. 5.

As described above with reference to FIG. 4, translation and routing tables may be updated when a packet is transmitted from within a VPN to a node outside the VPN. FIG. 5 is a process flow diagram illustrating a method of processing a packet by a service provider network NAT device in accordance with various embodiments of the invention that is received from outside the VPN and addressed to a node inside the VPN. As will be described in further detail below, the NAT device may maintain a plurality of routing tables, each of the routing tables being associated with a different one of a plurality of VPNs at 502. The NAT device may receive a packet at 504, wherein the packet includes an IP source address and an IP destination address, as well as information indicating one of the plurality of routing tables to route the packet. As shown at block 506, the NAT device may perform NAT on the packet. For instance, as described above, the MPLS tag may identify the network device responsible for performing NAT and routing the packet. In addition, the MPLS tag may also identify the VPN network. Thus, the VPN may be ascertained from the MPLS tag in order to identify an entry in a translation table such as that described above with reference to FIG. 4. Once an entry in the translation table is identified using the IP source address (and/or port), the IP destination address (and/or port), and the VPN identifier obtained from the packet, NAT is performed on the packet using the contents of the translation table entry.

Once NAT has been performed, the packet may be routed. Specifically, one of the plurality of routing tables maintained by the service provider network device must be identified at block 508 in order to route the packet. As described above, the VPN and/or VRF table identifier is identified in an MPLS tag in accordance with one embodiment. This VPN identifier is also preferably stored in the translation table entry. Thus, the appropriate routing table associated with a specific VPN may be identified using the VPN identifier obtained from the MPLS tag or, alternatively, from the VPN identifier stored in the translation table entry previously used to perform NAT on the packet.

Upon identification of the routing table associated with the VPN, an entry in the routing table is identified using the IP source address and the IP destination address in the packet as shown at block 510. The packet is then routed using the identified routing table entry at block 512.

The NAT device may receive a default route to a network device providing one or more shared services at 514. For example, the default route may be advertised by the network device providing one or more shared services, where each of the shared services is available to each of the VPNs. The NAT device may then update each of the plurality of routing tables to include the default route to the network device providing one or more shared services available to each of the VPNs at 516.

Figure 6:
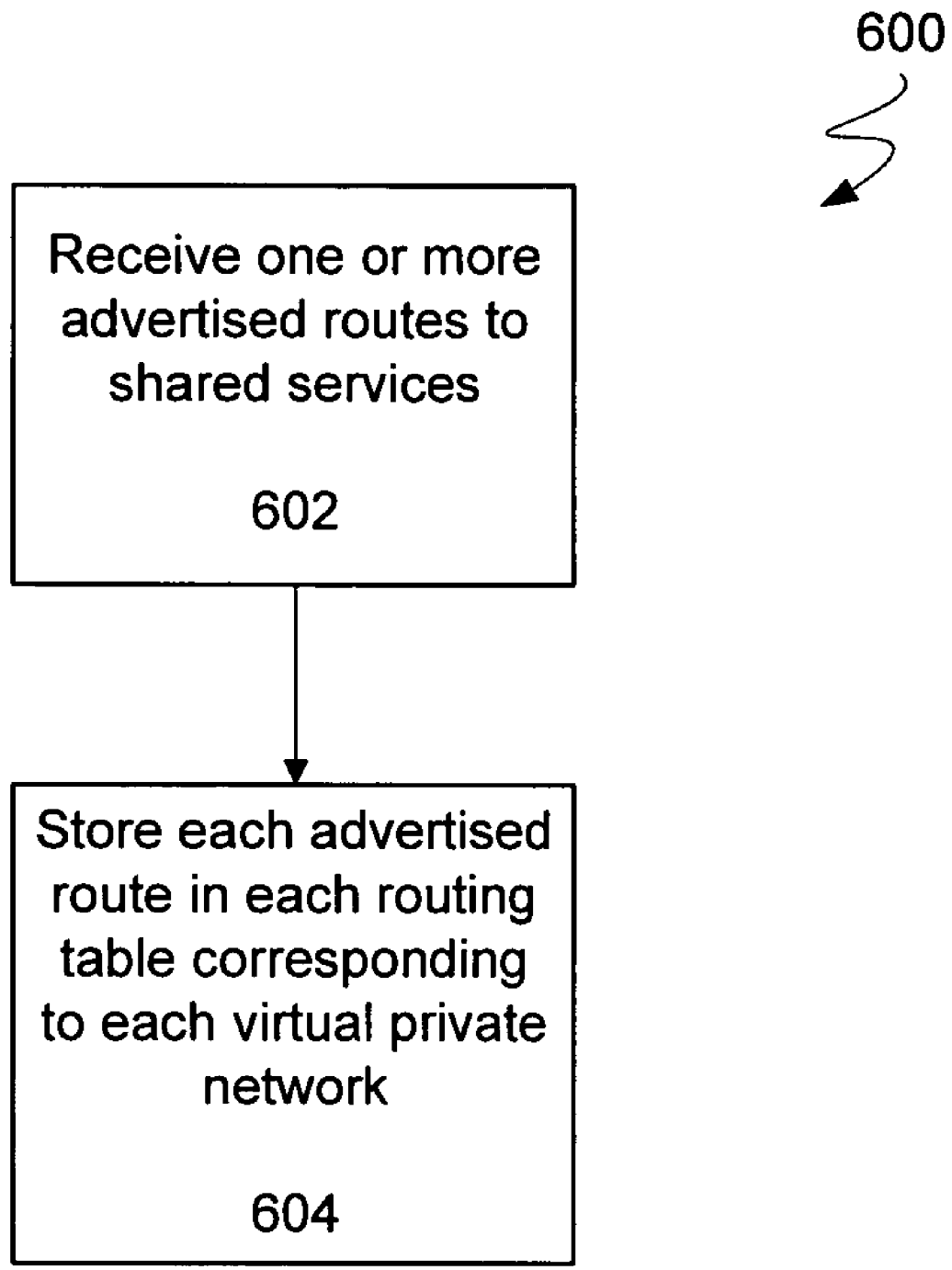
FIG. 6 is a process flow diagram illustrating a method of updating a plurality of virtual route forwarding tables with a default route to shared services in accordance with various embodiments of the invention.

In order to ensure that each VRF table (routing table) is updated, advertised routes are added to each of the routing tables maintained by the service provider edge box. FIG. 6 is a process flow diagram illustrating a method of updating a plurality of virtual route forwarding tables with a default route to shared services in accordance with various embodiments of the invention as shown at 600. Each network device that provides one or more shared services available to each VPN advertises a "default route" to reach the network device. As shown at block 602, one or more advertised default routes to shared services available to each VPN are received by the service provider edge box. Each of the plurality of routing tables corresponding to each VPN is then updated to include the default route(s) at block 604. In other words, each default route defines a route to reach a network device providing one or more shared services available to each VPN.

Generally, the techniques for performing network address translation and routing in accordance with various embodiments of the invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device or service provider edge box) may be implemented on a general-purpose network host machine such as a personal computer or workstation. Further, the invention may be at least partially implemented on a card (e.g., an interface card) for a network device or a general-purpose computing device.

Figure 7:
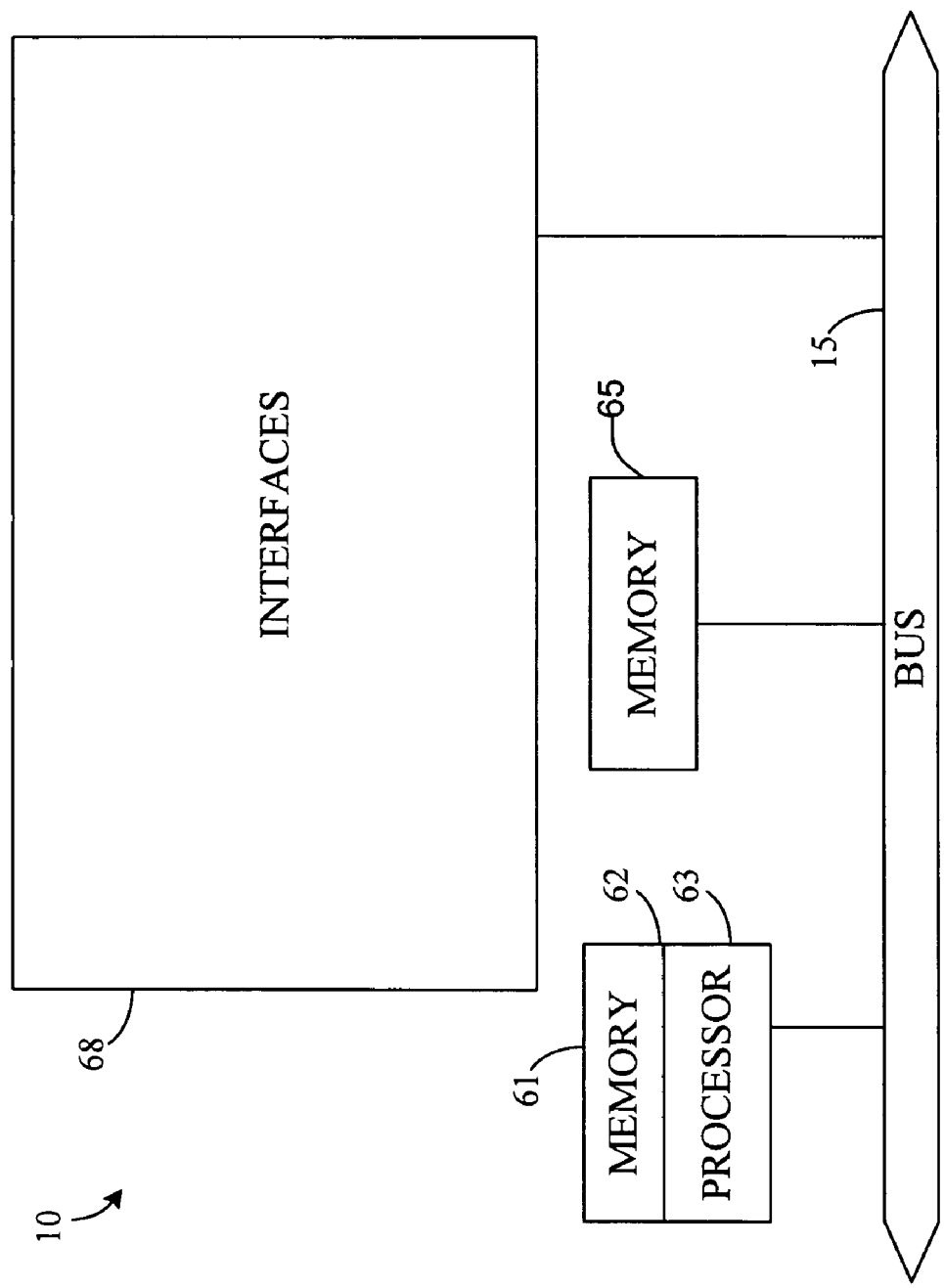
FIG. 7 is a diagrammatic representation of a router in which embodiments of the present invention may be implemented.

Referring now to FIG. 7, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining whether an address is a private address, determining whether a binding is present for a private address, and translating a private address or a DNS payload address into a public pool address, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store a virtual route forwarding table for each virtual private network.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, although the present invention is described with reference to the use of multiple routing tables, a single routing table may be used for multiple VPNs by inserting a VPN identifier in each routing table entry. Therefore, the described embodiments should be taken as illustrative and not restrictive, and the invention should not be limited to the details given herein but should be defined by the following claims and their full scope of equivalents.

What is claimed is:

1. In a network device for routing a packet, a method, comprising:
   maintaining a plurality of routing tables, each of a plurality of virtual private networks being associated with a different one of the plurality of routing tables;
   receiving a packet, the packet including an IP source address and an IP destination address, the packet further including information indicating one of the plurality of routing tables to route the packet, the information identifying one of the plurality of virtual private networks;
   performing Network Address Translation on the packet using a translation table to generate a translated packet;
   identifying one of the plurality of routing tables to route the translated packet using the information indicating one of the plurality of routing tables to route the packet such that one of the plurality of routing tables corresponding to the one of the plurality of virtual private networks is identified;
   identifying an entry in the identified one of the plurality of routing tables using the IP destination address;
   routing the translated packet using the identified routing table entry;
   receiving a default route to a network device providing one or more shared services, the default route to the network device providing one or more shared services being advertised by the network device providing one or more shared services, wherein each of the shared services is available to each of the plurality of virtual private networks; and
   updating each of the plurality of routing tables to include the default route, thereby enabling the plurality of virtual private networks to access the shared services via the default route that is included in each of the plurality of routing tables.

2. The method as recited in claim 1, wherein each of the plurality of virtual private networks is associated with a different customer.

3. The method as recited in claim 1, wherein the network device is associated with an ingress interface of a service provider network.

4. The method as recited in claim 1, wherein the network device is associated with an egress interface of a service provider network.

5. The method as recited in claim 1, wherein the network device is associated with a service provider network.

6. The method as recited in claim 1, wherein performing Network Address Translation on the packet comprises:
   translating the IP source address from a private address to a public address when the packet is received from a network device in a private network.

7. The method as recited in claim 1, wherein performing Network Address Translation on the packet comprises:
   translating the IP destination address from a public address to a private address when the packet is received from a network device in a public network.

8. The method as recited in claim 7, wherein the network device in the public network provides one or more services to each of the plurality of virtual private networks.

9. The method as recited in claim 1, wherein the packet includes an MPLS tag identifying the one of the plurality of virtual private networks, and wherein identifying one of the plurality of routing tables comprises:

ascertaining the one of the plurality of virtual private networks from the Multi Protocol Label Switching tag; and identifying the one of the plurality of routing tables associated with the ascertained one of the virtual private networks.

10. The method as recited in claim 9, wherein the Multi Protocol Label Switching tag further identifies the network device responsible for performing Network Address Translation and routing the packet.

11. In a network device for routing a packet, a method, comprising:

maintaining a plurality of routing tables, each of a plurality of virtual private networks being associated with a different one of the plurality of routing tables;

receiving a packet, the packet including an IP source address and an IP destination address, and a Multi Protocol Label Switching tag identifying the one of the plurality of virtual private networks, the packet further including information indicating one of the plurality of routing tables to route the packet, the information identifying one of the plurality of virtual private networks;

ascertaining one of the plurality of virtual private networks from the Multi Protocol Label Switching tag;

identifying an entry in a translation table including the IP source address, the IP destination address, and a virtual private network identifier identifying the ascertained one of the virtual private networks;

performing Network Address Translation on the packet using the entry in the translation table to generate a translated packet;

identifying one of the plurality of routing tables to route the translated packet using the information indicating one of the plurality of routing tables to route the packet such that one of the plurality of routing tables corresponding to the one of the plurality of virtual private networks is identified;

identifying an entry in the identified one of the plurality of routing tables using the IP destination address; and routing the translated packet using the identified routing table entry.

12. The method as recited in claim 11, wherein identifying one of the plurality of routing tables to route the packet comprises:

identifying the one of the plurality of routing tables from the entry in the translation table.

13. In a network device for routing a packet, a method, comprising:

maintaining a plurality of sets of routing information, each of a plurality of virtual private networks being associated with a different one of the plurality of sets of routing information;

receiving a packet, the packet including an IP source address and an IP destination address, the packet further including information indicating one of the plurality of sets of routing information to route the packet, the information identifying one of the plurality of virtual private networks;

performing Network Address Translation on the packet using a translation table to generate a translated packet;

identifying an entry in one of the plurality of sets of routing information using the IP destination address and the information indicating one of the plurality of sets of routing information to route the packet such that one of the plurality of sets of routing information corresponding to the one of the plurality of virtual private networks is identified;

routing the translated packet using the identified entry;

receiving a default route to a network device providing one or more shared services, the default route to the network device providing one or more shared services being advertised by the network device providing one or more shared services, wherein each of the shared services is available to each of the plurality of virtual private networks; and updating the plurality of sets of routing information to include the default route, wherein each of the plurality of sets of routing information corresponding to each of the plurality of virtual private networks is stored in one or more routing tables, thereby updating the one or more routing tables associated with the plurality of virtual private networks to include the default route to the network device providing one or more shared services available to each of the plurality of virtual private networks, enabling the plurality of virtual private networks to access the shared services via the default route that is included in each of the plurality of sets of routing information.

14. The method as recited in claim 13, wherein each of the plurality of sets of routing information corresponding to each of the plurality of virtual private networks is stored in a separate routing table.

15. The method as recited in claim 13, wherein each of the plurality of sets of routing information corresponding to each of the plurality of virtual private networks is stored in a single routing table, wherein each entry in the routing table includes a VPN identifier identifying the corresponding one of the plurality of virtual private networks.

16. The method as recited in claim 13, wherein updating the plurality of sets of routing information comprises:

updating a single routing table to include the default route.

17. The method as recited in claim 16, wherein the single routing table is dedicated to storing the default route to shared services available to each of the plurality of virtual private networks.

18. The method as recited in claim 16, wherein the single routing table stores the plurality of sets of routing information.

19. The method as recited in claim 13, wherein updating the plurality of sets of routing information comprises updating a plurality of routing tables to include the default route, each of the plurality of routing tables being associated with a different one of the plurality of virtual private networks.

20. A computer-readable medium storing thereon computer-readable instructions for routing a packet in a network device, comprising:

instructions for maintaining a plurality of routing tables, each of a plurality of virtual private networks being associated with a different one of the plurality of routing tables;

instructions for processing a packet that has been received, the packet including an IP source address and an IP destination address, the packet further including information indicating one of the plurality of routing tables to route the packet, the information identifying one of the plurality of virtual private networks;

instructions for performing Network Address Translation on the packet using a translation table to generate a translated packet;

instructions for identifying one of the plurality of routing tables to route the translated packet using the information indicating one of the plurality of routing tables to route the packet such that one of the plurality of routing tables corresponding to the one of the plurality of virtual private networks is identified;

instructions for identifying an entry in the identified one of the plurality of routing tables using the IP destination address;

instructions for routing the translated packet using the identified routing table entry; and instructions for updating each of the plurality of routing tables to include a default route to a network device providing one or more shared services, the default route to the network device providing one or more shared services being advertised by the network device providing one or more shared services, wherein each of the shared services is available to each of the plurality of virtual private networks, thereby enabling the plurality of virtual private networks to access the shared services via the default route that is included in each of the plurality of routing tables.

21. An apparatus, comprising:

means for maintaining a plurality of routing tables, each of a plurality of virtual private networks being associated with a different one of the plurality of routing tables;

means for receiving a packet, the packet including an IP source address and an IP destination address, the packet further including information indicating one of the plurality of routing tables to route the packet, the information identifying one of the plurality of virtual private networks;

means for performing Network Address Translation on the packet using a translation table to generate a translated packet;

means for identifying one of the plurality of routing tables to route the translated packet using the information indicating one of the plurality of routing tables to route the packet such that one of the plurality of routing tables corresponding to the one of the plurality of virtual private networks is identified;

means for identifying an entry in the identified one of the plurality of routing tables using the IP destination address;

means for routing the translated packet using the identified routing table entry;

means for receiving a default route to a network device providing one or more shared services, the default route to the network device providing one or more shared services being advertised by the network device providing one or more shared services, wherein each of the shared services is available to each of the plurality of virtual private networks; and means for updating each of the plurality of routing tables to include the default route, thereby enabling the plurality of virtual private networks to access the shared services via the default route that is included in each of the plurality of routing tables.

22. A network device, comprising:

a processor; and a memory, at least one of the processor or the memory being adapted for:

maintaining a plurality of routing tables, each of a plurality of virtual private networks being associated with a different one of the plurality of routing tables;

receiving a packet, the packet including an IP source address and an IP destination address, the packet further including information indicating one of the plurality of routing tables to route the packet, the information identifying one of the plurality of virtual private networks;

performing Network Address Translation on the packet using a translation table to generate a translated packet;

identifying one of the plurality of routing tables to route the translated packet using the information indicating one of the plurality of routing tables to route the packet such that one of the plurality of routing tables corresponding to the one of the plurality of virtual private networks is identified;

identifying an entry in the identified one of the plurality of routing tables using the IP destination address;

routing the translated packet using the identified routing table entry;

receiving a default route to a network device providing one or more shared services, the default route to the network device providing one or more shared services being advertised by the network device providing one or more shared services, wherein each of the shared services is available to each of the plurality of virtual private networks; and updating each of the plurality of routing tables to include the default route, thereby enabling the plurality of virtual private networks to access the shared services via the default route that is included in each of the plurality of routing tables.

23. An apparatus, comprising:

a processor; and a memory, at least one of the processor or the memory being adapted for:

maintaining a plurality of routing tables, each of a plurality of virtual private networks being associated with a different one of the plurality of routing tables;

receiving a packet, the packet including an IP source address and an IP destination address, and a Multi Protocol Label Switching tag identifying the one of the plurality of virtual private networks, the packet further including information indicating one of the plurality of routing tables to route the packet, the information identifying one of the plurality of virtual private networks;

ascertaining one of the plurality of virtual private networks from the Multi Protocol Label Switching tag;

identifying an entry in a translation table including the IP source address, the IP destination address, and a virtual private network identifier identifying the ascertained one of the virtual private networks;

performing Network Address Translation on the packet using the entry in the translation table to generate a translated packet;

identifying one of the plurality of routing tables to route the translated packet using the information indicating one of the plurality of routing tables to route the packet such that one of the plurality of routing tables corresponding to the one of the plurality of virtual private networks is identified;

identifying an entry in the identified one of the plurality of routing tables using the IP destination address; and routing the translated packet using the identified routing table entry.

24. The apparatus as recited in claim 23, wherein identifying one of the plurality of routing tables to route the packet comprises:

identifying the one of the plurality of routing tables from the entry in the translation table.

* * * * *